United States Patent [19]

Yim

[11] Patent Number: 5,499,889
[45] Date of Patent: Mar. 19, 1996

[54] WAVE POWER GENERATOR

[76] Inventor: Myung-Shik Yim, 642 Obang-li, Hail-myun, Gosung-gun, Kyungsangnam-do 638-920, Rep. of Korea

[21] Appl. No.: 345,768

[22] Filed: Nov. 22, 1994

[30] Foreign Application Priority Data

May 22, 1992 [KR] Rep. of Korea ............... 8731/92

[51] Int. Cl.⁶ .................................................. F03B 13/12
[52] U.S. Cl. ........................ 405/76; 405/75; 60/497; 290/42; 290/53
[58] Field of Search .................. 405/78, 76, 75; 60/497; 290/42, 53

[56] References Cited

U.S. PATENT DOCUMENTS

| | | | |
|---|---|---|---|
| 2,715,366 | 8/1955 | Vartiainen | 405/76 X |
| 2,783,022 | 2/1957 | Salzer | 405/76 X |
| 3,487,228 | 12/1969 | Kriegel | 405/76 X |
| 3,515,889 | 6/1970 | Kammerer | 290/53 |
| 4,454,429 | 6/1984 | Buonome | |
| 4,560,884 | 12/1985 | Whittecar | 290/42 |
| 4,622,473 | 11/1986 | Curry | |

FOREIGN PATENT DOCUMENTS

| | | | |
|---|---|---|---|
| 2093124 | 8/1982 | United Kingdom | |
| 3024752 | 12/1993 | WIPO | 290/53 |

Primary Examiner—Ramon S. Britts
Assistant Examiner—Frederick L. Lagman
Attorney, Agent, or Firm—Burns, Doane, Swecker & Mathis

[57] ABSTRACT

A wave motion power generator comprising a frame, including ballast members and buoyancy members, first cross members extending between opposed buoyancy members, a plurality of pairs of cylinders, a hollow piston rod associated with each cylinder, support bars extending upwardly from the second cross members, a buoyancy plate having elongate openings through which the support bars extend, the buoyancy plate being connected to the piston rods associated with a pair of the cylinders, a pressure reservoir, a manifold connected with the reservoir, a flexible conduit connected between each piston rod and the manifold and an electricity generator driven by liquid discharged from the reservoir.

2 Claims, 5 Drawing Sheets

FIG. 5a
FIG. 5b
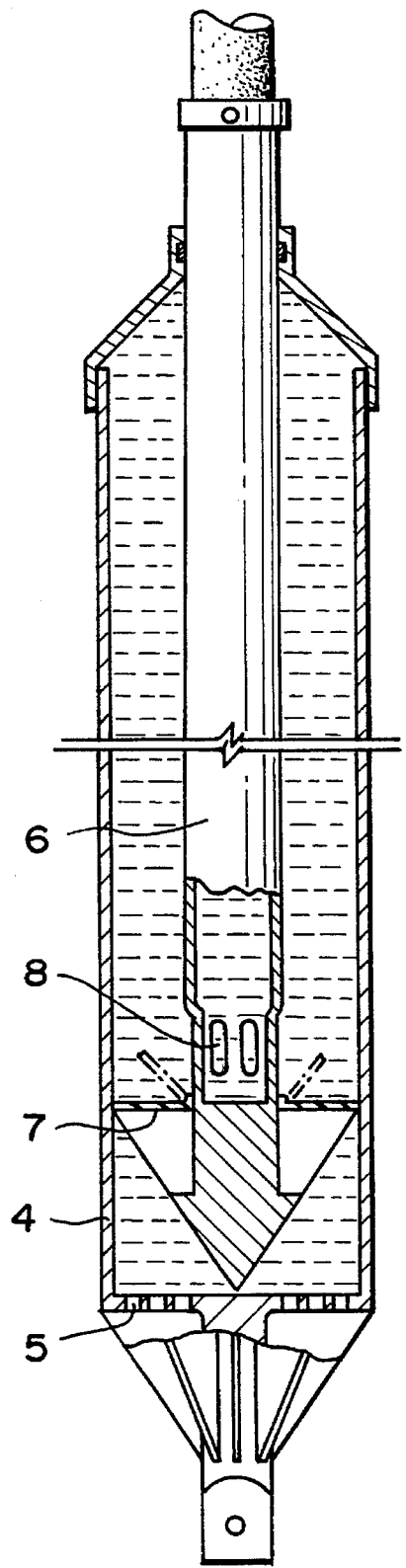
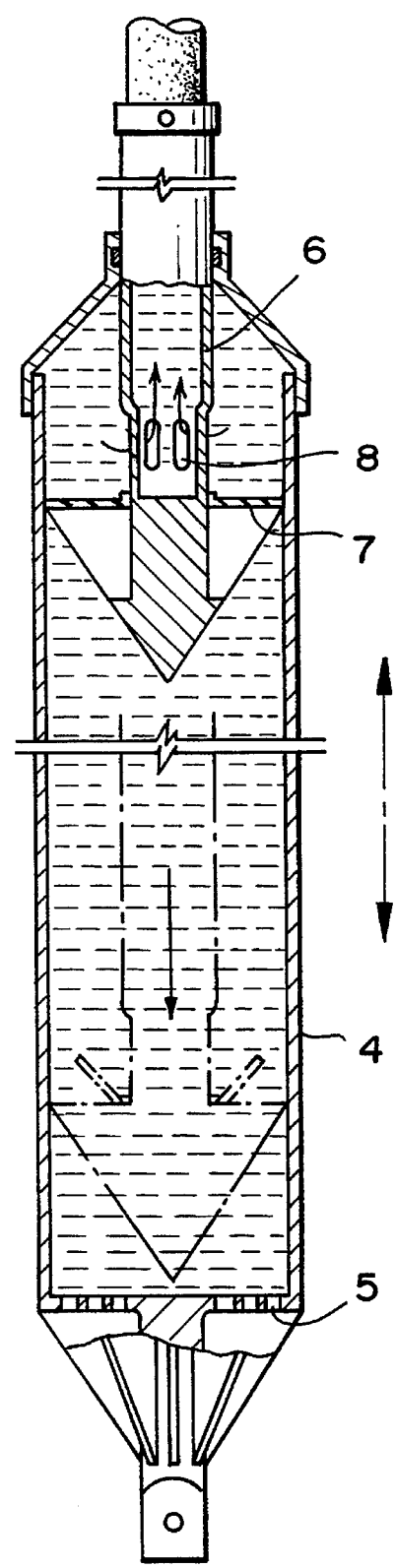

5,499,889

1
WAVE POWER GENERATOR

This application is a continuation-in-part of PCT/KR93/00045, filed May 21, 1993, which designated the United States.

BACKGROUND OF THE INVENTION

This invention relates to a wave power generator device which is readily transferable to and held in a deep sea location subject to large wave motions, having the capacity to generate electrical energy by utilizing effectively pressure energy derived from the waves.

The need for further electrical energy increases as energy consumption per man, and the population, increases.

Accordingly, there is concern that an electrical energy crisis may occur. To cope with the increasing demand, steam power and water power generators are well known. Furthermore, solar energy charging systems, and atomic energy and nuclear fusion generators are widely used. Furthermore, some generators utilizing sea wave power have been developed. While solar energy can be converted into electrical energy and stored during a clear day, electrical energy is not readily recovered during the night or in rainy or snowy conditions.

Atomic energy and nuclear fusion generators have technical problems with respect to safety, disposal of the nuclear waste materials and environmental pollution. Furthermore, the cost of manufacturing atomic energy and nuclear fusion generators is high.

A conventional sea wave-utilizing generator has a structure which is fixedly mounted in the water. Accordingly, it should be installed on the coast or in shallow waters. However, a large amount of energy cannot be obtained in such locations since only small amounts of sea wave energy are available there. Consequently, it is difficult to choose an acceptable installation for a conventional sea wave-utilizing generator. Furthermore, it is impossible to install such a generator in a deep sea location.

The present invention is defined in the accompanying claims to which reference is hereby made.

SUMMARY OF THE INVENTION

A wave power generator of this invention is readily movable to and can be held in a heavy sea for effectively creating pressure energy which can be use to generate large amounts of electrical energy. The device comprises upright buoyancy pipes mounted vertically on opposite sides of ballast members, and a plurality of pairs of cylinders having inlet openings mounted on cross members connecting the opposite upright buoyancy pipes. Each cylinder has a hollow piston member having openings and a foldable piston head. Support bars are movably mounted on cross members at the lower ends thereof and inserted through elongate openings in buoyancy plates so that the buoyancy plates are vertically movable along the support bars. The upper ends of the piston members are movably connected to the undersides of the buoyancy plates and then connected to hoses. The hoses are connected to a main reservoir through water manifolds, to the sides of which reservoirs are provided large and small capacity generators.

BRIEF DESCRIPTION OF THE DRAWINGS

The present invention can be put into practice in various ways, one of which will now be described by way of example with reference to the accompanying drawings, in which:

FIGS. 5a and b are horizontal sectional views showing the operation of the delivery rods associated with the cylinders.

DETAILED DESCRIPTION OF THE PREFERRED EMBODIMENTS

Figure 1:
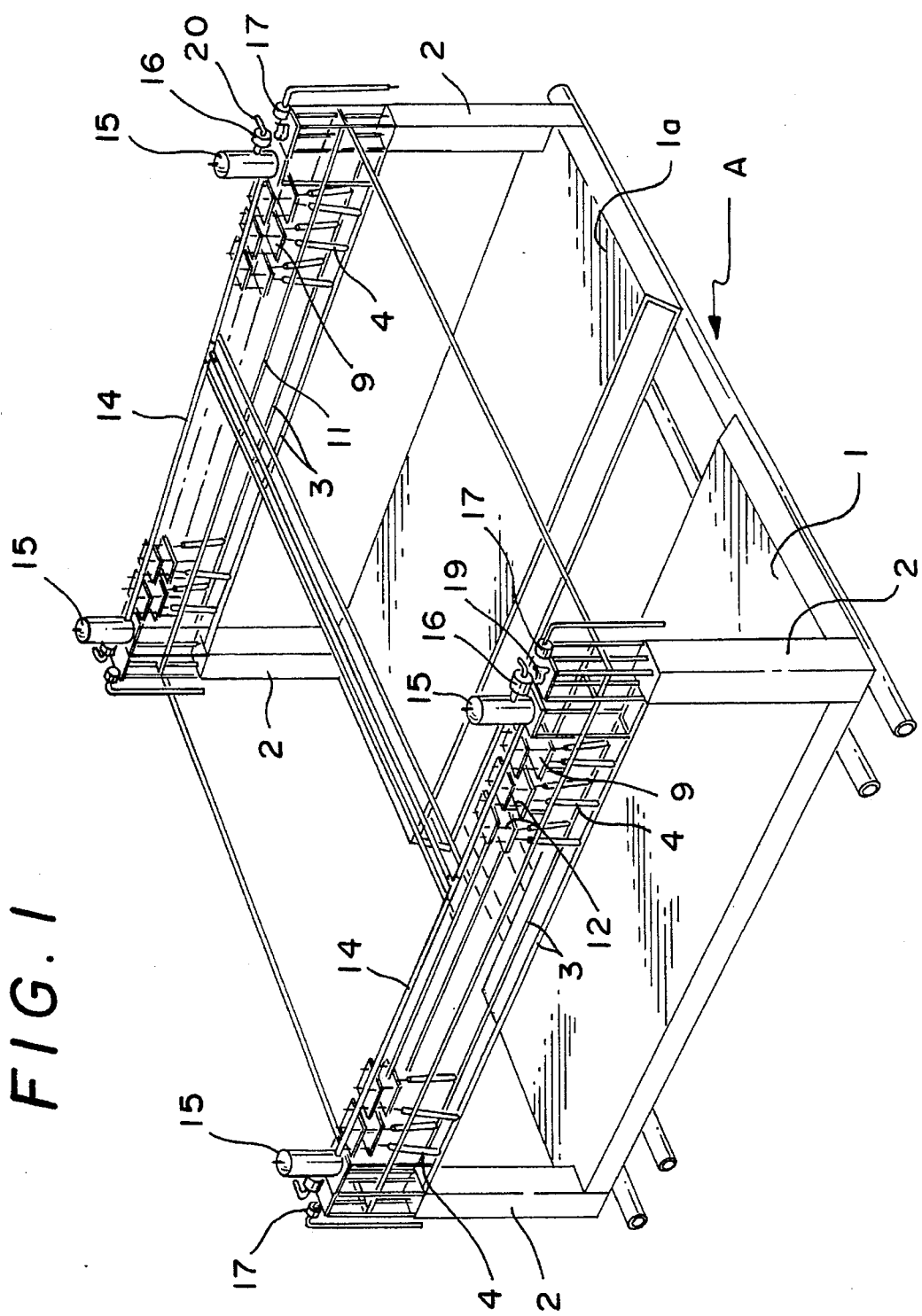
FIG. 1 is a perspective view of a sea wave power generator according to the present invention.
Figure 2:
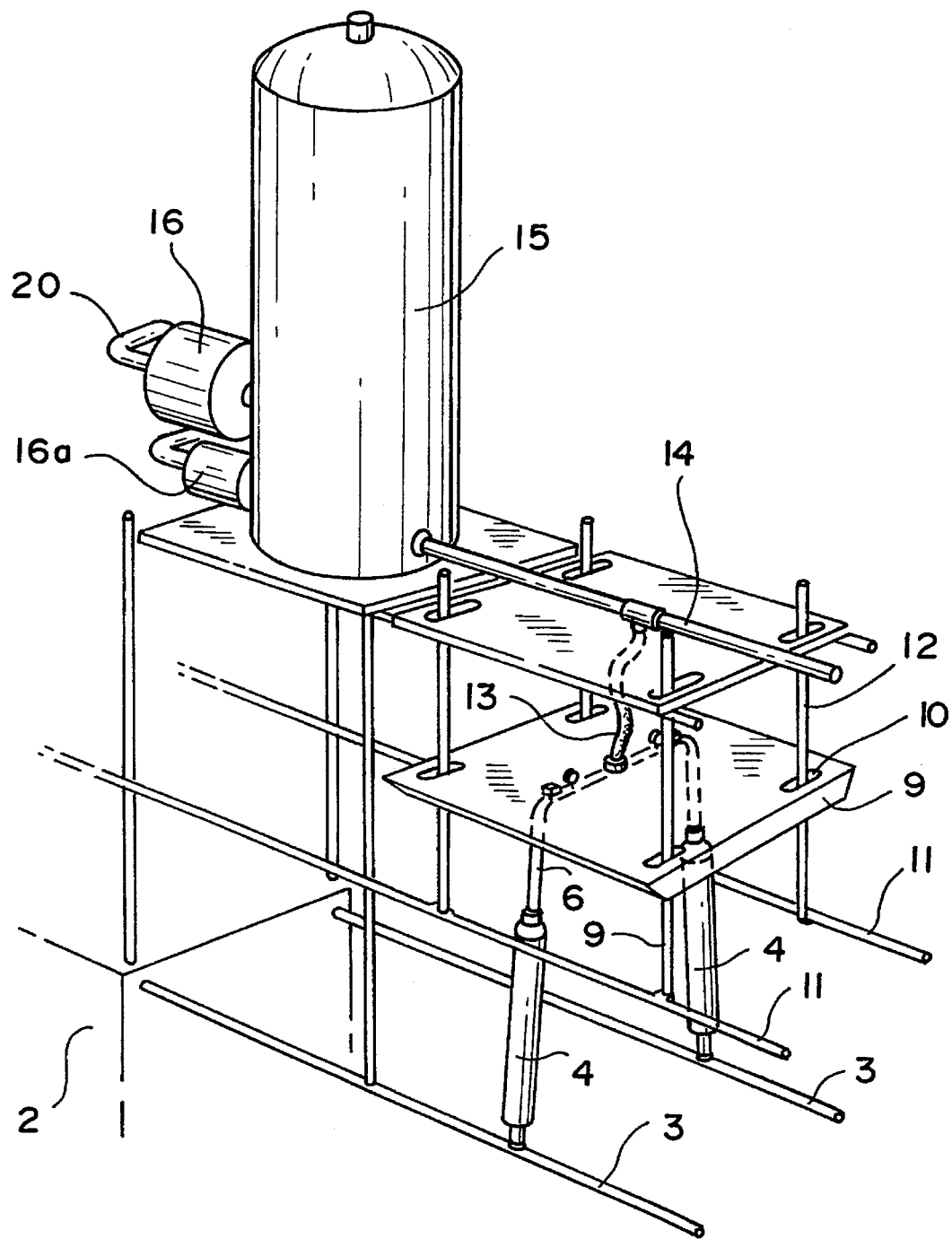
FIG. 2 is an enlarged view of a portion of the generator of FIG. 1.

Referring to the drawings, rectangular spaced ballast members 1, 1a are filled with sea water. Upright buoyancy pipes 2 are each vertically mounted in the respective outer corners of the base structure defined by the ballast members 1, 1a. The ballast members 1, 1a and the upright buoyancy pipes 2 constitute a framework A of the wave power generator of this invention. Pairs of the buoyancy pipes 2 extending from the corners of the same ballast member 1/1a are connected to each other by spaced cross members 3 towards the tops of the pipes 2. A plurality of pairs of cylinders have inlet openings 5 in the bottom face thereof and are each respectively movably mounted on the cross members 3. A hollow piston rod 6, having a foldable piston head 7 and openings at the lower part thereof, is reciprocally disposed within each cylinder 4. The upper ends of each associated pair of hollow piston rods 6 are movably connected with the underside of a buoyancy plate 9 and in communication with respective hoses 13 through a slot 8 in the piston rod 6. Each hose 13 is connected from between its piston rod 6 and a water manifold 14 which is, in turn, connected with a water pressure reservoir 15 standing above each buoyancy pipe 2. Large and small capacity generators 16, 16a are mounted to one side of each manifold 14.

The buoyancy plates 9 extend in a line above the cross members 3. Each buoyancy plate 9 has elongate openings 10 through which support bars 12 extend. The plates 9 are movable vertically along the bars 12. The lower ends of the support bars 12 are movably mounted on cross members 11 which are mounted above and between the buoyancy pipes connected by the cross members 3.

Numerals 17, 19 and 20, respectively, designate pumps, air inlet pipes of the buoyancy pipes 2 and discharge pipes.

The framework A is arranged to float in the water by virtue of the overall buoyancy of the ballast members 1, 1a and the upright buoyancy pipes 2. When installed the buoyancy plates 9 float on the water with the upper hoses 13 being unfolded and straight. The hollow piston rod 6, upright buoyancy pipes 2 and ballast members 1, 1a sink to the prescribed depth by regulating the amount of sea water admitted into the upright buoyancy pipes 2 by means of the pumps 17. With this structure, the framework A of this invention is readily floated to and submerged in a deep sea location where large waves occur and held in position by conventional anchoring as used for known sea structures.

Figure 3:
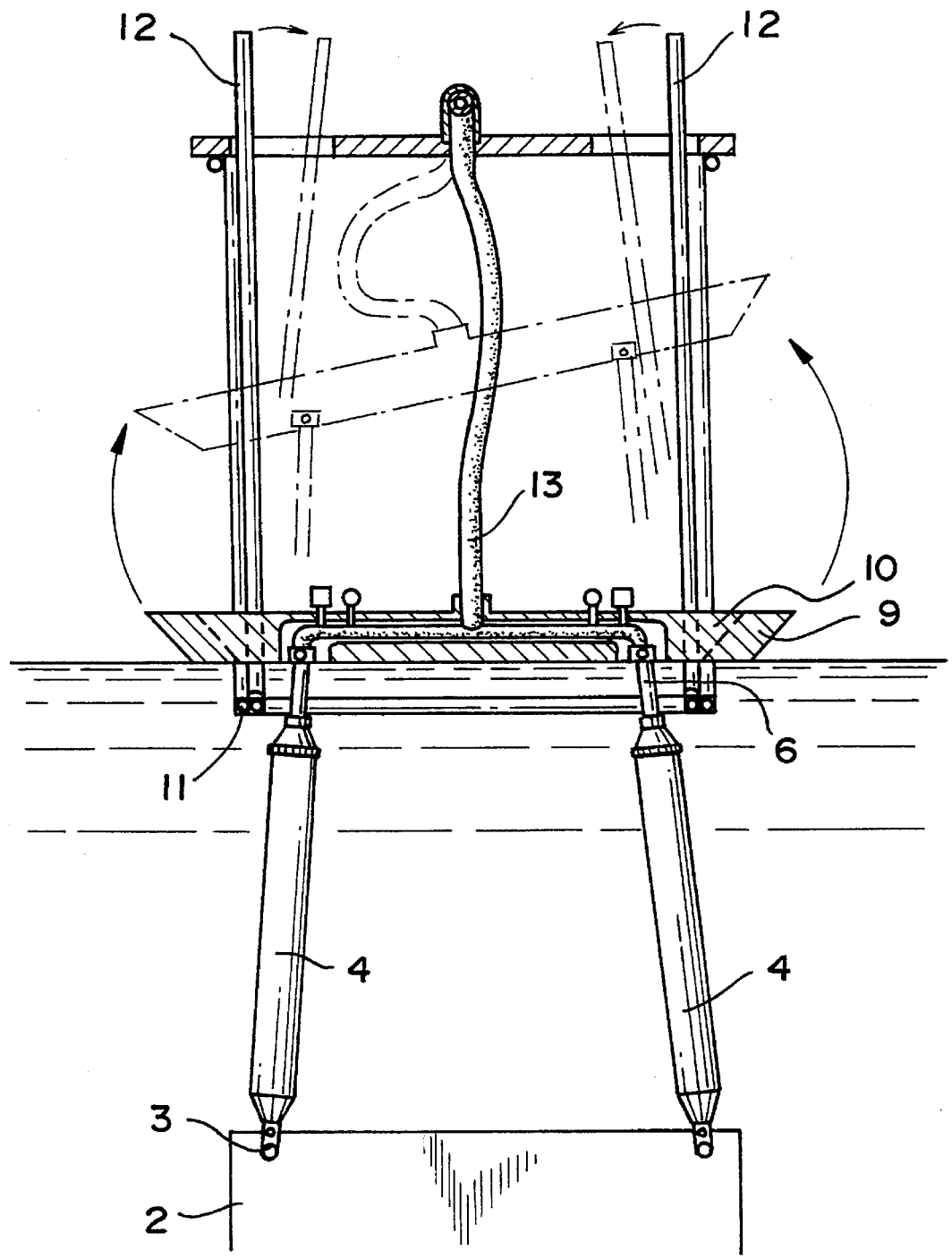
FIG. 3 is a side elevational view of the generator of FIG. 1, showing the operation of the buoyancy plates mounted on the top of cylinders.
Figure 4:
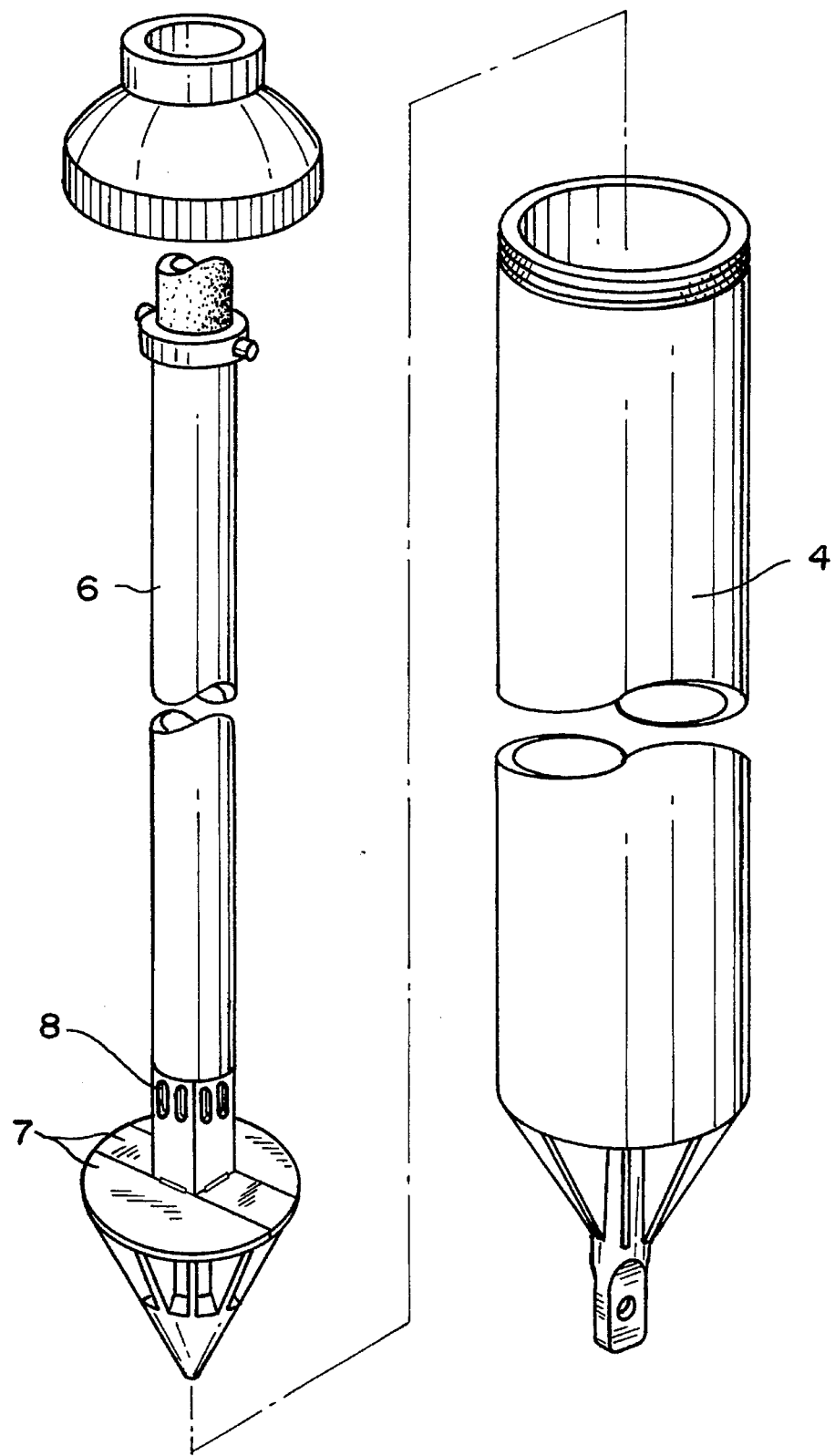
FIG. 4 is an exploded perspective view of the cylinders and delivery rods.

When waves break on one side of the framework A with the buoyancy plates 9 arranged to be floating on the surface of the water, the plates 9 are raised vertically along the support bars 12 (see FIG. 3) by an amount depending on the wave height. When the plates are lifted by a wave, the hollow piston rods 6 also move upwardly out of the cylinders 4 by the same distance as the displacement of the plates 9. As each hollow piston member 6 is raised from the position shown in FIG. 5a to that in FIG. 5b (as indicated by the solid line in FIG. 5b) the associated piston head 7 is in the unfolded position. As the piston head 7 is lifted, the sea water above it is put under pressure. Consequently, the sea water in the cylinders 4 above the piston head 7 enters rapidly the hollow piston rod 6 through the openings 8 therein as a result of the high pressure created and then discharged to the manifold 14 through the hoses 13. At the same time more water is drawn into the cylinders 4 below the raised unfolded piston head 7 through the inlet openings 5.

Thereafter, the buoyancy plates 9 are lowered as the wave subsides. The hollow piston rod 6 are also lowered into their respective cylinders. As the rods 6 are also lowered into their respective cylinders. As the rods are lowered, the piston rods 7 are folded upwardly as shown by the chain lines in FIG. 5a, causing the hollow piston rods 6 to fall rapidly without meeting significant resistance.

Whenever the buoyancy plates 9 are moved vertically by a passing wave, the hollow pistons 6 are raised vertically with respect to the cylinders 4, performing the pumping operation, whereby the sea water in the cylinders 4 is forced to flow into the water manifold 14. The sea water forced into the manifold 14 is collected in the pressure control reservoir 15, large and small generators 16, 16a are operated by the force resulting from the pressure of water discharged to the water pipes 20 connected with the generators to generate electrical power.

With this invention, the amount of sea water in the upright buoyancy pipes 2 is adjusted depending on the height of the waves. The buoyancy plates move vertically, effectively with the rise and fall of the waves.

The manifolds 14 above the ballast members 1, 1a may be interconnected, the sea water entering only one of the reservoirs 15 depending on the pressure of the sea water entering the manifold 14. Otherwise, the generators 16, 16a may be operated selectively. Where necessary, a plurality of the ballast members 1, 1a may be mounted together with regular spacing.

Even if it is submerged temporarily by a strong wave, the device of this invention rises to the sea surface immediately due to the overall buoyancy of the ballast members 1, 1a and the upright buoyancy pipes 2. Furthermore, the ballast members 1, 1a themselves are not likely to rise to the sea surface nor likely to overturn even when strong waves break on the framework A, since the bottom faces of the members 1, 1a are wide and the inside of the members 1, 1a are always full of sea water.

The wave power generator of this invention may be held in place in coastal waters, where there is little difference between the rise and fall of the tide, or may be readily carried to and fixed in a deep sea location. Furthermore, the wave power generator of this invention has a large potential capacity for electrical power generation. The loss of the power generating capability of the waves rarely occurs since generation is to be conducted in a deep sea location.

The sea water creates a pressure by pumping the water using the forces of the wave action. Accordingly, the manufacturing and maintenance costs of the device are very low.

I claim:

1. A wave motion power generator comprising:

a frame, including ballast members and buoyancy members mounted toward edges of the ballast members;

first cross members extending between opposed buoyancy members;

a plurality of pairs of cylinders, each cylinder having an inlet in a lower end thereof and being mounted on a respective one of the first cross members;

a hollow piston rod associated with each cylinder, the rod having an opening at a lower end thereof and a collapsible piston head arranged to be deployed and to draw water into the cylinder as the rod is moved away from the opening and to collapse as the rod is moved towards the said opening;

second cross members extending between the said opposed buoyancy members;

support bars extending upwardly from the second cross members;

a buoyancy plate having elongate openings through which the support bars extend, the buoyancy plate being connected to the piston rods associated with a pair of the cylinders;

a pressure reservoir;

a manifold connected with the reservoir;

a flexible conduit connected between each piston rod and the manifold; and an electricity generator driven by liquid discharged from the reservoir.

2. A generator as claimed in claim 1, including a pump operable to admit water to the buoyancy members to adjust the buoyancy of the frame.

\* \* \* \* \*